The specification in this patent is not in print.
R. H. LONG.
STEAM ENGINE FOR PROPELLING CARS.
No. 1,125. Reissued Jan. 15. 1861.
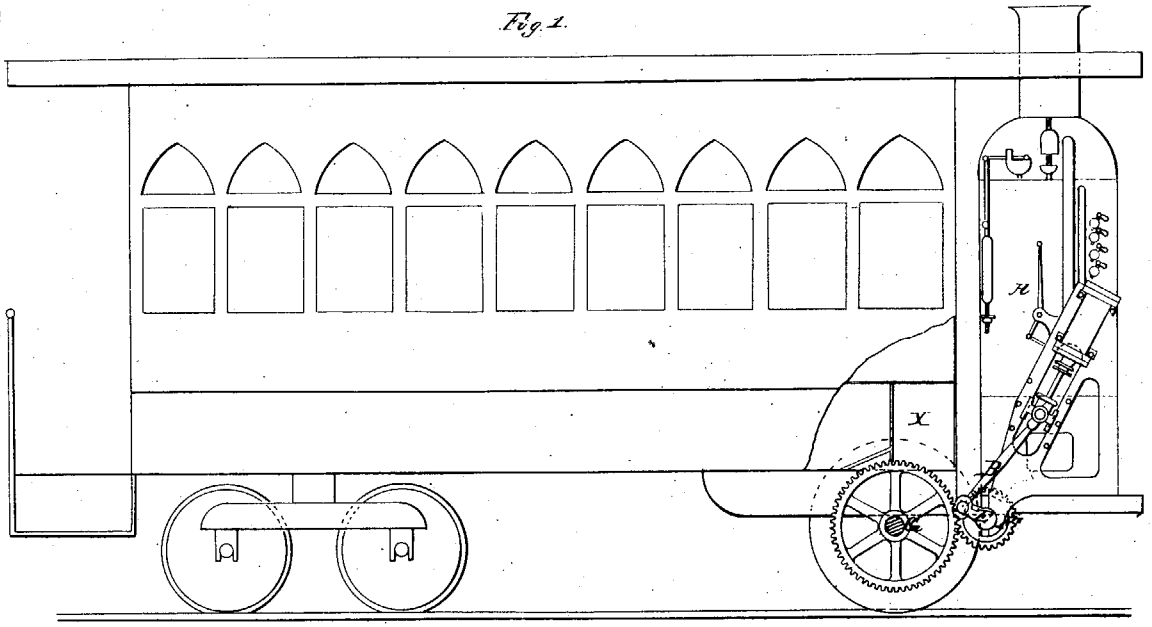
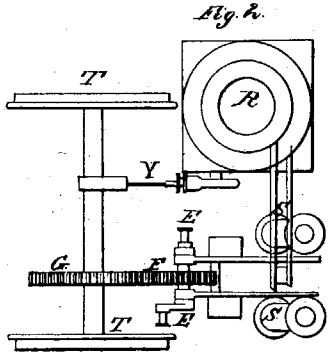
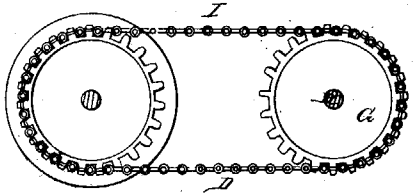
Witnesses.
Joseph Gree
J. G. Mason Child
Inventor
Robt. H. Long
THE NORRIS PETERS CO., PHOTO-LITHO., WASHINGTON, D. C.

UNITED STATES PATENT OFFICE.

ROBERT H. LONG, OF PHILADELPHIA, PENNSYLVANIA.

IMPROVED ARRANGEMENT OF STEAM-ENGINES FOR PROPELLING STREET PASSENGER-CARS.

Specification forming part of Letters Patent No. 26,911, dated January 24, 1860; Reissue No. 1,125, dated January 15, 1861.

*To all whom it may concern:*

Be it known that I, ROBERT H. LONG, of the city and county of Philadelphia, and State of Pennsylvania, have made a new and useful Improvement in the Mode of Propelling Railway-Cars by Steam; and I do hereby declare the following to be a full, clear, and exact description of the same, reference being had to the annexed drawings, making a part of this specification, in which—

Figure 1 is a side view of a railway-car containing my improvement. Fig. 2 is a plan of the same. Fig. 3 shows a mode of connecting the engine with the axle.

My invention consists, first, in placing small engines and boiler upon the front platform of a railway-car, as shown at A; secondly, in so constructing the engine as to bring the shaft on a parallel and horizontal line with the car-axle.

My invention is adapted to railroads wherever a separate locomotive, from its size, would be objectionable. Hitherto engines have been placed on the top of, under the bottom of, and in the car; but all these plans are more or less objectionable. I arrange the boiler and engine upon one platform, (the forward one preferred,) and connect the engine, either by the way hereinafter described or in any other convenient way, directly with the wheels of the car. Fig. 2 shows one method of arrangement. M is the boiler. S S are the engines. P and G are the pinion and cog-wheel; T T, the car-wheels; and Y is the pump for supplying the boilers. By this means the room for passengers is not decreased, while ample room is afforded for the engineer upon the platform, and at the same time all parts of the engine are under his immediate view and control. The water-tank X is placed in the front of the car and so arranged as to form an additional seat; or it might be placed under the seats, as now arranged. The frame of the engine is brought almost immediately in contact with the driving-wheels, and the pinion F is placed upon the frame itself. The advantage of this arrangement is, that the engine is made stronger and more compact. The jolting of the car upon its springs renders great strength absolutely indispensable. The connecting-rod B is attached by means of the crank E to a pinion, F. The pinion F is geared into a cog-wheel, G. This cog-wheel may be upon the forward axle of the car, as shown in Fig. 1, and thus transmit the motion directly to the car-wheel; or it may be on a separate shaft, H, as shown in Fig. 3, and the motion transmitted to the forward wheels of the car by means of an endless chain, I I, passing over another cog-wheel on the forward axle.

I have above described one of the engines and the mode of attaching it to the car. A similar engine may be placed upon the other side of the car and attached in a similar manner. The cog-wheel G is of a larger size and furnished with a greater number of teeth than the pinion F, by which means the power is increased. The advantage of this mode of connection is that smaller engines running at a great velocity may be used and an amount of power attained equal to that produced by a large and heavier engine connected in the ordinary manner.

The advantage of placing the shaft E on a line horizontal, or nearly so, with the car-axle and connecting the same by pinion gearing is, that whenever the engine is jolted it causes a slight movement of the cog-wheel on the shaft E around the cog-wheel on the axle G without disturbing the gearing. If the engine were directly geared to the axle of the car G by a crank, or if the two cog-wheels shown in the drawings were in any other position than that with the axles in a horizontal line, or nearly so, it is evident that any jolting of the car would tend to break the connections or injure the cylinder-heads.

The advantage of placing the pinion F upon the frame of the engine is, that it permits the engine to be brought close to its work, and by reason of the relative location of the axle G and shaft E the jolting of the car upon the road does not cause any injurious effect to the engine.

Having thus described my improvement, what I claim as my invention, and desire to secure by Letters Patent, is as follows:

1. Placing a steam engine and boiler, constructed and arranged as described, on the platform of a railway-car in the manner substantially as specified.

2. Placing the pinion F upon the frame of the engine, thus permitting the engine to be brought close to its work and the whole to be used in combination with a railway-car, for the purposes set forth.

ROBT. H. LONG.

Witnesses:

JOSEPH GRICE,

J. G. MINI CHILD.